United States Patent
Aiello

(10) Patent No.: US 8,476,793 B2
(45) Date of Patent: Jul. 2, 2013

(54) STIFFENER TAB FOR A SPINDLE MOTOR BASE PLATE

(76) Inventor: Anthony J. Aiello, Santa Cruz, CA (US)

( * ) Notice: Subject to any disclaimer, the term of this patent is extended or adjusted under 35 U.S.C. 154(b) by 0 days.

(21) Appl. No.: 12/114,753

(22) Filed: May 3, 2008

(65) Prior Publication Data

US 2009/0273258 A1    Nov. 5, 2009

(51) Int. Cl.
 *H02K 1/22*   (2006.01)
 *G11B 5/52*   (2006.01)
(52) U.S. Cl.
 USPC .............. 310/67 R; 360/98.07; 360/99.01; 360/99.04; 360/99.08
(58) Field of Classification Search
 USPC .. 310/67 R, 51, 91, 254.1, 89, 64; 360/98.07, 360/99.01, 99.04, 99.08, 99.12
 See application file for complete search history.

(56) References Cited

U.S. PATENT DOCUMENTS

| | | | |
|---|---|---|---|
| 4,965,476 A * | 10/1990 | Lin | 310/51 |
| 6,396,177 B1 * | 5/2002 | Shin et al. | 310/63 |
| 6,762,518 B1 * | 7/2004 | Yamaguchi et al. | 310/67 R |
| 7,044,721 B2 * | 5/2006 | Horng et al. | 417/423.7 |
| 2004/0160135 A1 * | 8/2004 | Horng et al. | 310/67 R |
| 2005/0140220 A1 * | 6/2005 | Tsuda et al. | 310/67 R |
| 2006/0163965 A1 * | 7/2006 | Chen et al. | 310/186 |
| 2008/0012443 A1 * | 1/2008 | Tamaoka et al. | 310/179 |

FOREIGN PATENT DOCUMENTS

JP  03285544 A  * 12/1991
JP  2002315254 A  * 10/2002

OTHER PUBLICATIONS

JP 2002315524 A machine translation on Jun. 30, 2011.*
Machine translation of JP 2002315254 A.*

* cited by examiner

*Primary Examiner* — Tran Nguyen
*Assistant Examiner* — Leda Pham

(57) ABSTRACT

An apparatus and method are provided for stiffening a base plate of a spindle motor to improve shock resistance and vibration response, and thereby increase reliability and performance of a disc drive memory system. A stiffener tab for stiffening a base plate is connected to the base plate, extends from the base plate, and is dimensioned to fit adjacent to a stator tooth. Stiffening of a base plate is especially useful in the case of stamped base plate designs that typically have uniform thickness, whereas cast base plate designs are formed with thicker sections. In an aspect, the present invention stiffens a motor cup portion of the base plate, and replaces stiffness lost by removal of material from the base plate to form holes for recessing a stator into the base plate. Axial and angular displacement of a spindle motor during shock events and vibration are decreased.

26 Claims, 8 Drawing Sheets

STIFFENER TAB FOR A SPINDLE MOTOR BASE PLATE

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disc to ensure the proper reading and writing of information. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs. Because rotational accuracy is critical, many disc drives presently utilize a spindle motor having a fluid dynamic bearing (FDB) situated between a shaft and sleeve to support a hub and the disc for rotation. In a hydrodynamic bearing, a lubricating fluid is provided between a fixed member bearing surface and a rotating member bearing surface of the disc drive. Hydrodynamic bearings, however, suffer from sensitivity to external loads or mechanical shock. In particular, the stiffness of the fluid dynamic bearing is critical so that the rotating load is accurately and stably supported on the spindle without wobble or tilt.

Traditional base plate designs in larger disc drives are typically cast from aluminum. However, in the field of spindle motors for small form factor hard disc drives, thin stamped base plates are often employed for cost and manufacturing advantages. These stamped base plates are typically a steel material of generally uniform thickness, and therefore do not allow for localized thicker sections to optimize the tradeoff of stiffness versus space savings. Also, small form factor disc drives are typically so impacted for space due to slimness requirements that holes are now commonly punched out of the base plate into which stator winding coils are recessed to lower the stator height and allow more space inside the disc drive without increasing the size of the disc drive. However, forming a hole in a base plate and removing material from the base plate further lessens vibration resistance of an already thin base plate and thereby increases susceptibility to read-write errors of the disc caused by any vibration. Also, by removing material from the base plate, the base plate may become more susceptible to permanent deformation in the case of a shock event, in which, for example, the motor is jarred or dropped.

SUMMARY

An apparatus and method are described herein for stiffening a base plate of a spindle motor. A bearing is defined between a stationary component and a rotatable component, wherein the stationary component and the rotatable component are positioned for relative rotation. The stationary components include a base plate and a stator. The stator comprises at least one stator tooth. A stiffener tab, connected to, or integral with, the base plate, extends from the base plate, and is dimensioned to fit adjacent to at least one stator tooth, for stiffening the base plate. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
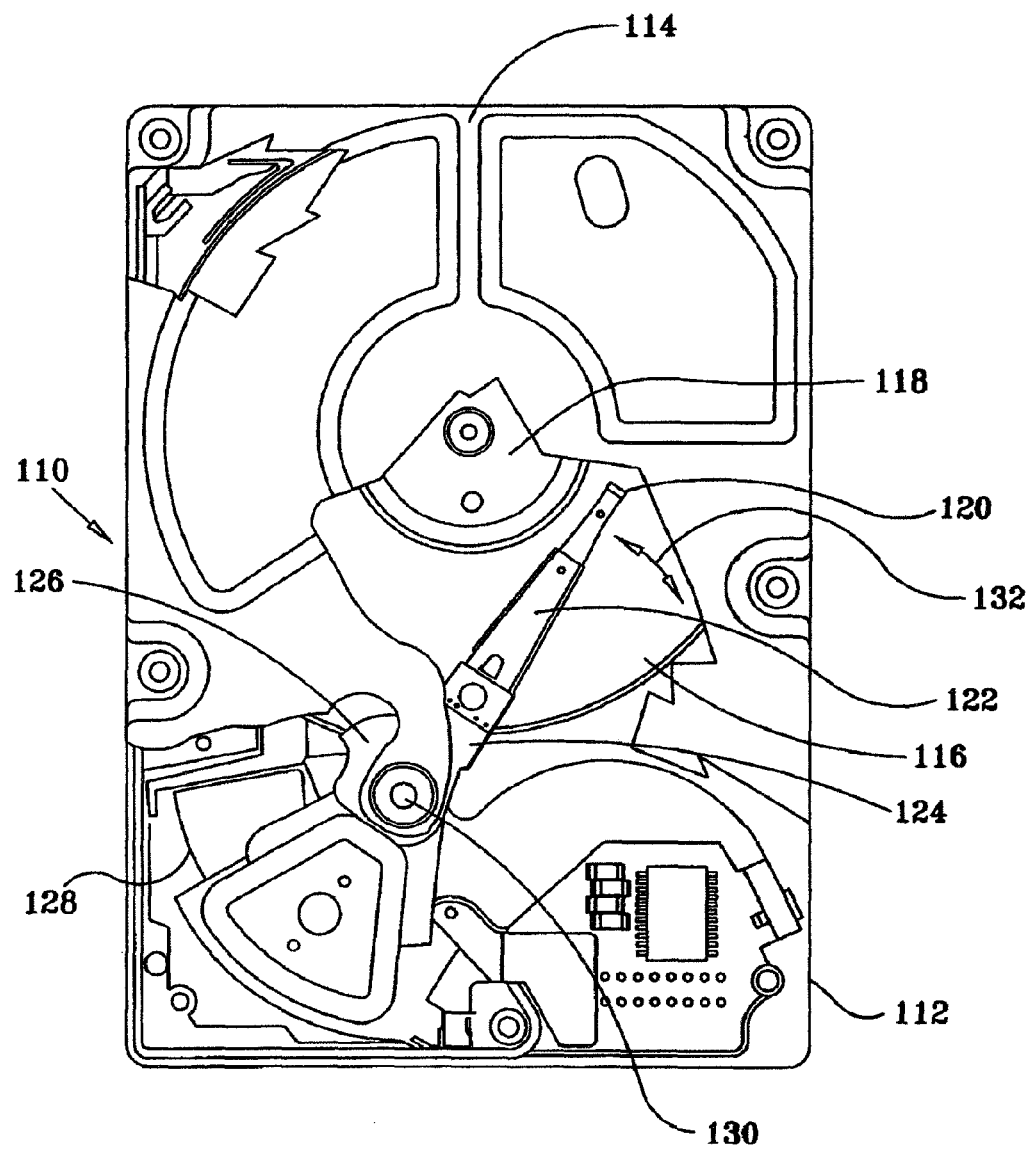
FIG. 1 is a top plan view of a disc drive data storage system in which the present invention is useful, in accordance with an embodiment of the present invention.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method are described herein for stiffening a base plate of a spindle motor to improve shock resistance and vibration response, and thereby increase reliability and performance of a disc drive memory system. Stiffening of a base plate is especially useful in the case of stamped base plate designs that typically have uniform thickness, whereas cast base plate designs are formed with thicker sections. When a base plate is cast, the present invention provides, in an embodiment, a stiffener tab formed along with the casting. In an embodiment, the present invention stiffens a motor cup portion of the base plate, thereby replacing stiffness lost by removal of material from the base plate used to form holes for recessing a stator.

Axial and angular displacement of a spindle motor during shock events and vibration are decreased. The improved axial and angular stiffness results in the read/write heads of a storage device being accurately aligned with storage tracks on a disc, when the device is subjected to vibration. This allows discs to be designed with increased track densities, and also allows for smaller discs and/or increased storage capacity of discs. Also, changes can be made to the natural frequency of the base plate axial and bending modes of vibration, therefore the present invention can further provide improved acoustic performance of the motor-base system.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures as described in this Description and should not be construed as limiting.

Referring to the drawings wherein identical reference numerals denote the same elements throughout the various views, FIG. 1 illustrates a top plan view of a typical disc drive data storage system 110 in which the present invention is useful. Clearly, features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
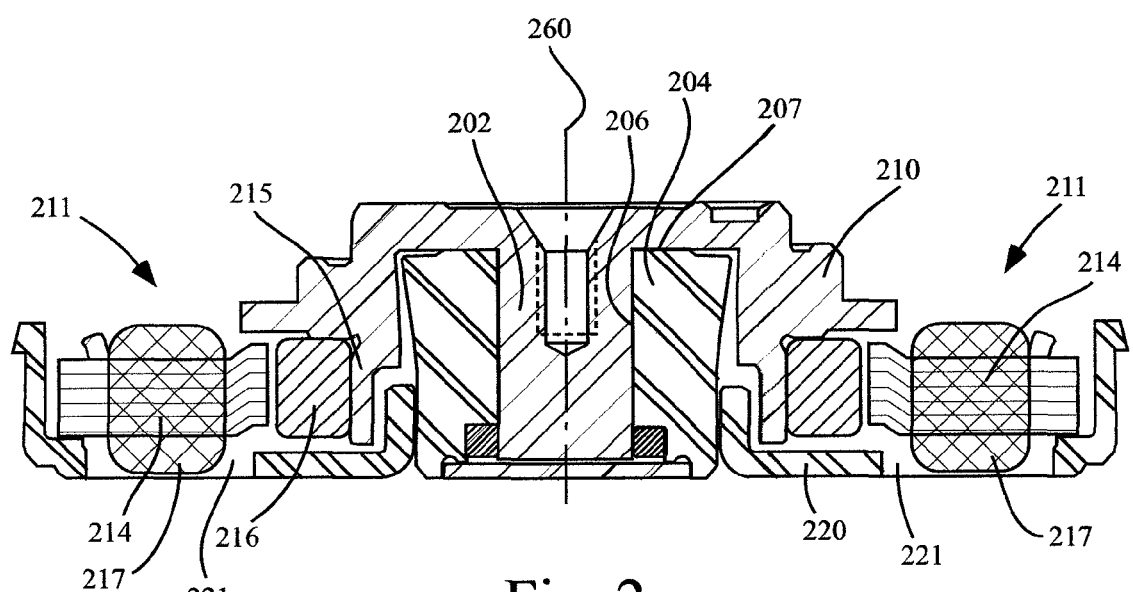
FIG. 2 is a sectional side view of a contemporary spindle motor used in a disc drive data storage system incorporating a contemporary base plate with holes into which stator teeth are recessed for space savings.

Referring to FIG. 2, a sectional side view is illustrated of a contemporary spindle motor as used in a disc drive data storage system 110, incorporating a base plate 220 with holes 221 into which stator windings 217 are recessed for space savings. This fluid dynamic bearing motor includes a rotatable component that is relatively rotatable about a stationary component, defining a journal bearing 206 therebetween. In this example, the rotatable components include shaft 202 and hub 210. Hub 210 includes a disc flange, which supports disc pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 204 and stator 211, which are affixed to base plate 220. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that useable fluids include a liquid, a gas, or a combination of a liquid and gas.

Figure 3:
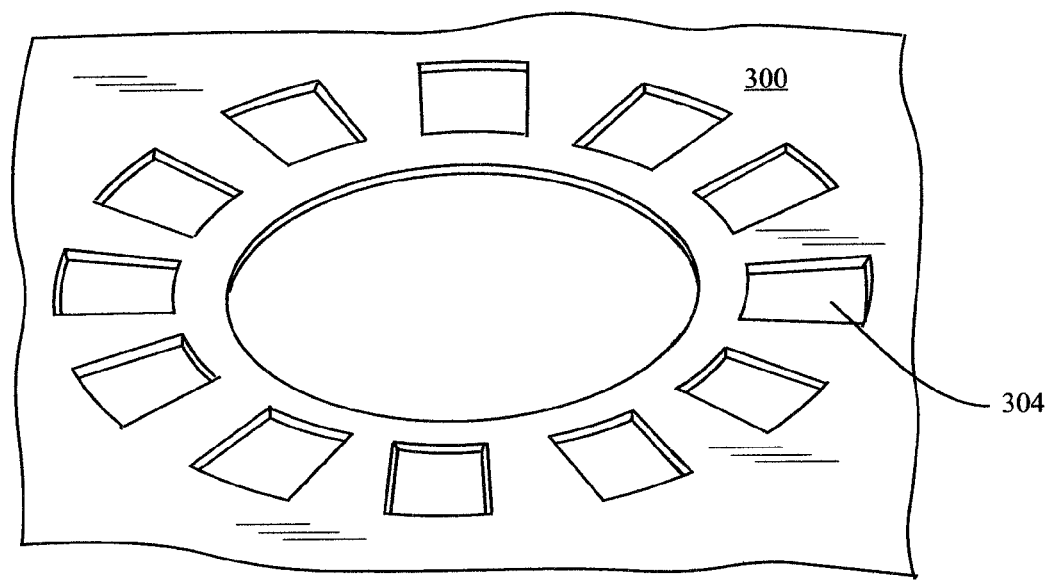
FIG. 3 is a perspective view of a portion of a base plate for a spindle motor as in FIG. 2, the base plate having holes for receiving a recessed stator.

Since memory systems are being utilized in progressively more environments, a demand exists for smaller and thinner motors, and consequently thinner base plates. FIG. 3 is a perspective view of a portion of a base plate 300 for a spindle motor as used in FIG. 2. Current thicknesses for a stamped steel base plate in a small form factor hard disc drive range from 0.2 to 0.8 millimeters. As shown, base plate 300 includes holes 304 for receiving a recessed stator, for further reducing the axial thickness of a motor. Holes 304 formed into base plate 300 further reduce the stiffness of an already thin base plate 300.

Figure 4:
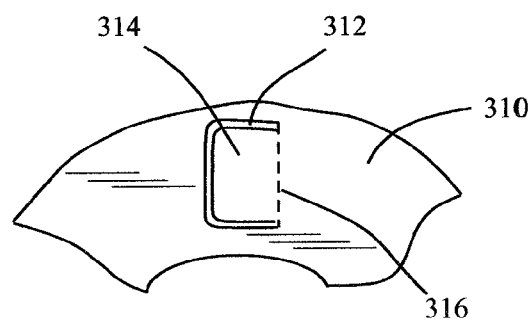
FIG. 4 is a plan view of a portion of a base plate wherein a hole is being formed for receiving a recessed stator for a spindle motor, wherein a stiffener tab is being formed from a portion of the base plate that is ultimately displaced to form the hole, in accordance with an embodiment of the present invention.

FIG. 4 is a plan view of a portion of a base plate 310 in which a hole 312 is being formed for receiving a recessed stator for a spindle motor. A stiffener tab 314 is formed from a portion of the base plate 310, and the stiffener tab 314 is ultimately displaced to form the hole 312, in the case of a stamped steel base plate, in accordance with an embodiment of the present invention. The material that forms stiffener tab 314 is thus utilized, rather than discarded as is typically carried out. A bend is eventually formed in base plate 310 at a position represented at margin 316, extending stiffener tab 314 from base plate 310 into the motor cup space. The number and placement of stiffener tabs about a base plate is chosen to optimize the stiffness and stability of the base plate. In an embodiment, all stator holes form a stiffener tab, while in another embodiment, less than all stator holes form a stiffener tab.

Figure 5:
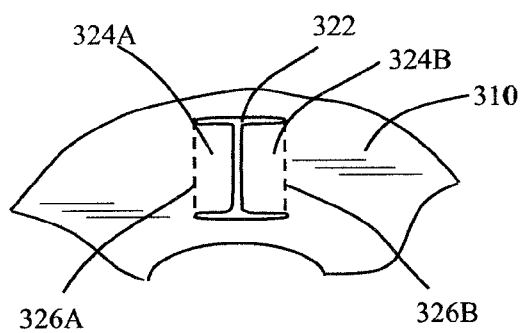
FIG. 5 is a plan view of a portion of a base plate wherein a hole is being formed for receiving a recessed stator for a spindle motor, wherein two stiffener tabs are being formed from a portion of the base plate that is ultimately displaced to form the hole, in accordance with another embodiment of the present invention.

The portion of the base plate that is displaced and defines the hole is utilized to form one stiffener tab, two stiffener tabs, or more than two stiffener tabs. FIG. 5 illustrates two stiffener tabs 324A and 324B being formed from a portion of the base plate 320 that ultimately displaced to form the hole 322, in accordance with another embodiment of the present invention. In this embodiment, a bend is ultimately formed in base plate 320 at a position represented at margins 326A and 326B, extending stiffener tabs 324A and 324B from base plate 320 into the motor cup space. By way of these stiffener tabs, the present invention can serve to reduce axial and angular displacement of a spindle motor during shock events and vibration. By improving shock resistance and vibration response, consistently accurate alignment of the read/write heads of a storage device with storage tracks on a disc can result. This in turn allows discs to be designed with increased track densities, and also allows for smaller discs and/or increased storage capacity of discs.

Additionally, in an embodiment, the present invention adjusts the natural frequency of the base plate axial and bending modes of vibration. The natural frequency is tuned by adjusting the number of stiffener tabs employed or by adjusting the size of the stiffener tabs such as length and height changes. Improved acoustic performance of the motor-base system can also be provided by the present invention. In cases where a base design has a natural frequency aligned with the electromagnetic frequencies of the motor, the natural frequencies of the base can be shifted using the stiffener tabs to reduce the base excitation and resulting acoustic emissions. Thus, the present invention is employed to adjust and benefit the system acoustic output as well. Additionally, the stiffener tabs can be used to improve effects from operating vibration response when the disc drive is subjected to external vibration from its environment. As an example, when a disc drive is vibrated at the same natural frequency as the motor base system, then the disc drive vibration response will considerably increase. In an embodiment, the present invention shifts the motor base resonance to a frequency that is out of range of any expected operating vibration, thus reducing the response to any operating vibration.

Figure 6:
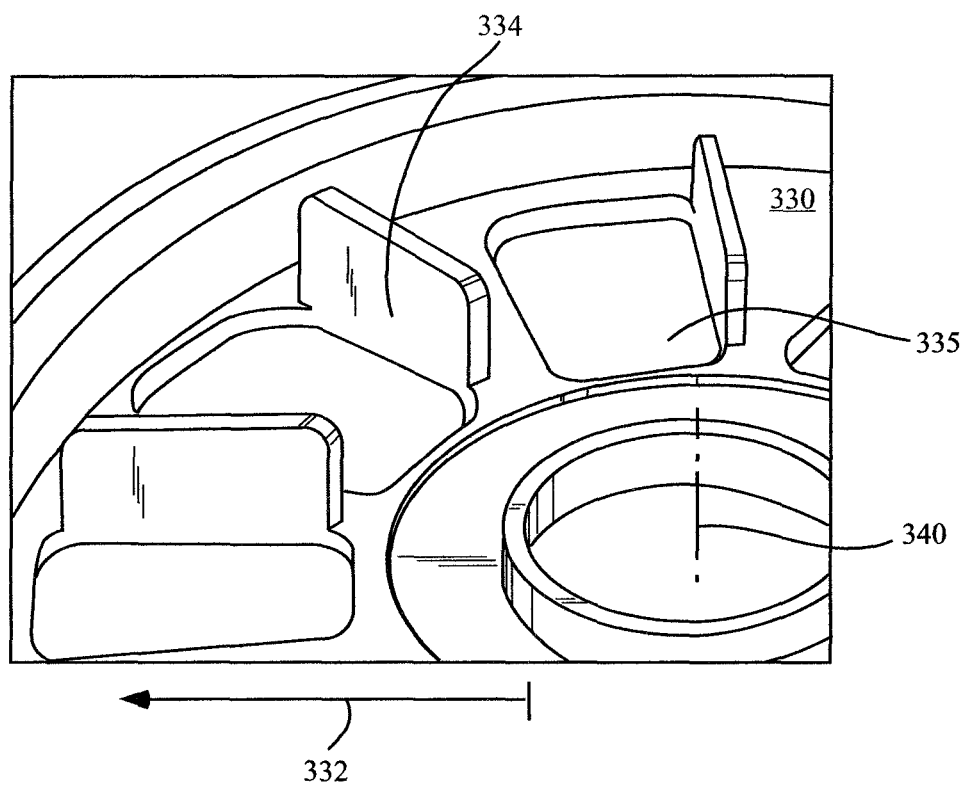
FIG. 6 is a perspective view of a portion of a base plate as in FIG. 4, wherein the stiffener tabs extend at a 90 degree angle with respect to a radially extending span of the base plate, in accordance with an embodiment of the present invention.

Referring to FIG. 6, a perspective view is illustrated of a portion of a base plate as in FIG. 4, wherein the stiffener tab 334 extends at a 90 degree angle with respect to a radially extending span 332 of the base plate 330, in accordance with an embodiment of the present invention. The radially extending span 332 is defined herein as perpendicular to the axis 340 of a shaft (like the axis 260 of shaft 202 shown in FIG. 2). The stiffener tab 334 is connected to the base plate and extends from the base plate. The stiffener tab 334 is formed either from a portion of the base plate 330 that is displaced to form the hole 335, or formed from a separate material that is attached to the base plate 330 using, for example, an adhesive. The base plate 330 may be created by either a stamping process or a casting process. When the base plate 330 is cast, the stiffener tab 334 can alternatively be formed along with the casting. Holes may be defined through a cast aluminum base plate, or alternatively, depressions are formed in the base plate to minimize the base plate thickness.

Stiffener tab 334 can be formed to extend at angles other than a 90 degree angle with respect to a radially extending span 332 of the base plate 330. The selected angle for the stiffener tab 334 can be based on the available area for the stiffener tab 334, as well as the resulting stiffness and natural frequency of the base plate 330. The available area for the stiffener tab 334 is based on the clearance between the stator windings.

Figure 7:
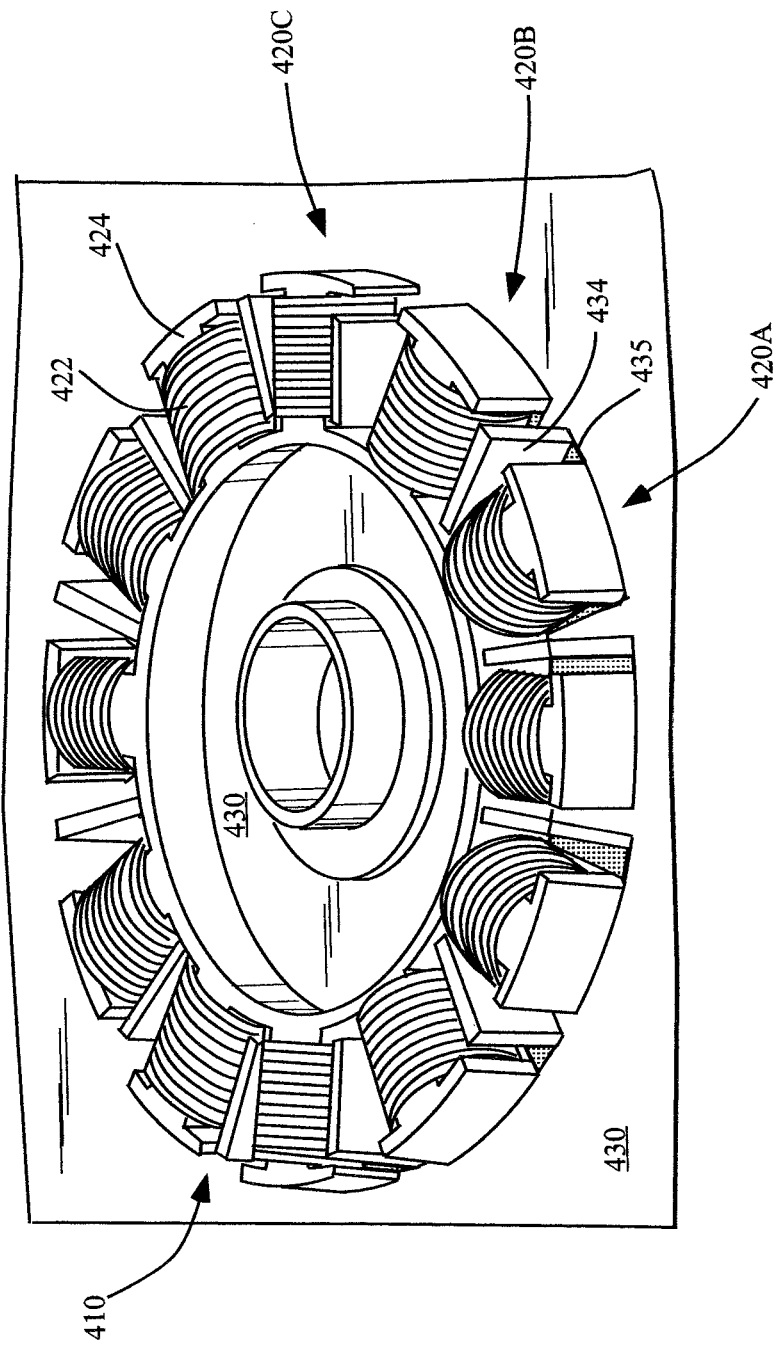
FIG. 7 is a perspective view of a plurality of stator teeth for attaching to a stationary component of a spindle motor, wherein stiffener tabs extend from a base plate and adjacent to the stator teeth, in accordance with an embodiment of the present invention.

Turning now to FIG. 7, a perspective view is shown of a plurality of stator teeth 420 for attaching to a stationary component of a spindle motor. The stiffener tabs 434 extend from base plate 430 and adjacent to the stator teeth 420, in accordance with an embodiment of the present invention. The stator teeth 420 include lamination stack 424 and stator windings 422. It is to be appreciated that the present invention stiffener tab 434 can be employed with a stator having only one stator tooth, and can also be employed with a typical stator having more than one stator tooth, such as a stator with nine stator teeth. In this example, stator 410 includes twelve stator teeth. The stiffener tab 434 is positioned circumferentially adjacent to the first stator tooth 420A and the second stator tooth 420B.

Stiffener tab 434 is formed from a portion of the base plate 430 that is displaced and defines a hole 435 within the base plate 430, and thus the stiffener tab 434 is situated adjacent to the hole 435. Here, the stiffener tabs 434 are dimensioned to fit adjacent to the stator teeth. At least a portion of a stiffener tab is positioned circumferentially adjacent to the stator. When the stiffener tab is formed from a hole, the stiffener tab may be trimmed or otherwise shaped to fit adjacent to the stator teeth. When the stiffener tab is attached to a base plate, rather than being formed from a portion of a base plate that is displaced and defines a hole within the base plate, then the stiffener tab can be selectively shaped and placed.

Figure 8:
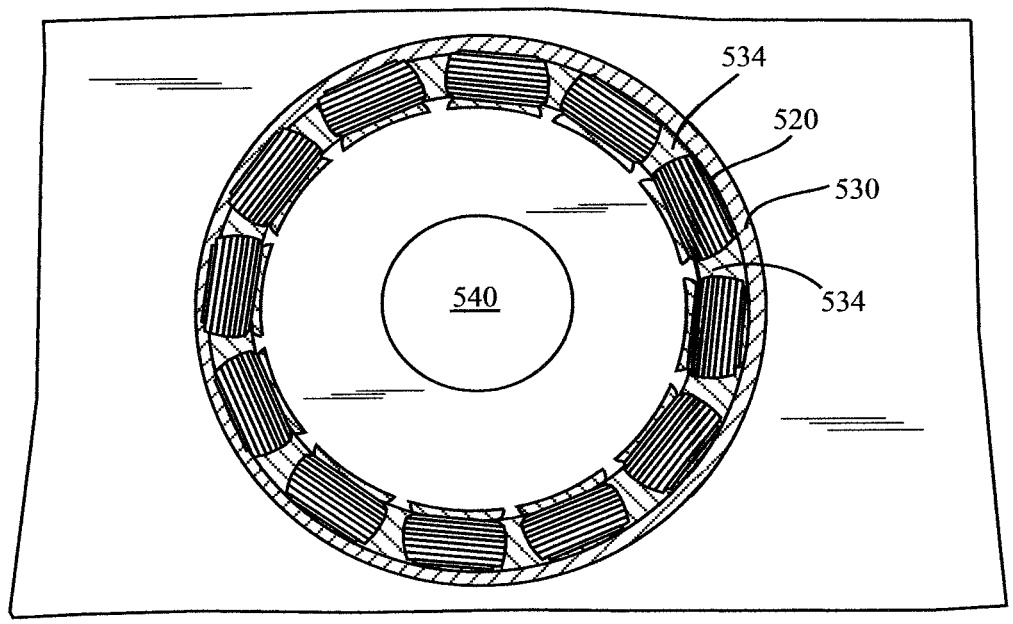
FIG. 8 is a plan view of a plurality of stator teeth for attaching to a stationary component of a spindle motor, wherein stiffener tabs extend from a base plate between the stator teeth within an unoccupied area, in accordance with another embodiment of the present invention.

FIG. 8 illustrates a plan view of a plurality of stator teeth 520 for attaching to a stationary component of a spindle motor. As compared with the stator illustrated in FIG. 7, the stator illustrated in FIG. 8 is designed for positioning outboard of an interacting magnet. The stiffener tabs 534 extend from a base plate 530 between the stator teeth within an unoccupied area. In this embodiment, the stiffener tabs 534 are formed with dimensions (i.e., length, width, and height) for filling an unoccupied area defined adjacent to the stator teeth 520, such that the dimensions of the stiffener tabs 534 are maximized to an extent without interfering with any motion of the spindle bearing system. The stiffener tabs can be shaped as desired including having a step, a slope, or maximized in size to fit adjacent to a structure. The number of the stiffener tabs utilized is chosen depending on factors including the available space between stator teeth, base manufacturing constraints, and structural resonance requirements.

Figure 9A:
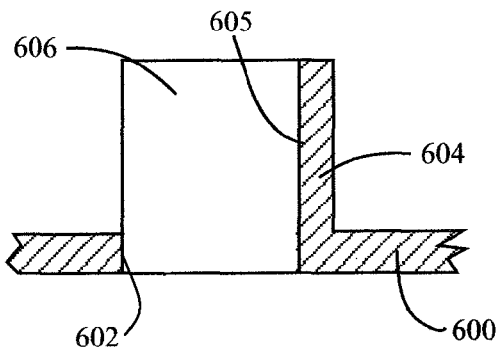
FIG. 9A is a sectional side view of a stator tooth partially recessed into a hole in a base plate for a spindle motor, wherein a stiffener tab extends from the base plate and attaches to the stator tooth, in accordance with an embodiment of the present invention.

As illustrated in FIG. 9A, a sectional side view is shown of a stator tooth 606 partially recessed into a hole 602 in a base plate 600 for a spindle motor. The portion of the stator tooth 606 that is recessed into hole 602 is either: i) a portion of the stator windings; or ii) a portion of the stator lamination stack; or iii) a portion of the stator windings and a portion of the stator lamination stack. A stiffener tab 604 extends from the base plate 600 and attaches to at least a portion of the stator tooth 606, in accordance with an embodiment of the present invention. As an example, the stiffener tab 604 may be attached to the stator windings only, to the stator lamination stack only, or to both the stator windings and stator lamination stack. Again, as described herein "stator tooth" or "stator teeth" include both a stator lamination stack and the stator windings about the respective stator lamination stack. If the stiffener tab 604 is electrically conductive, then it may be electrically insulated from stator tooth 606 to avoid any electrical shorting of the stator tooth 606. The stiffener tab 604 is positioned circumferentially adjacent to the stator tooth 606, and, optionally, an adhesive 605 interlocks the stator tooth 606 and the stiffener tab 604, thereby dampening any vibration of the stator tooth 606, and adding structural support to stiffen the base plate assembly. The adhesive directly connects the stiffener tab to the stator lamination stack, to the stator windings, or to both the stator lamination stack and the stator windings. In an alternative design, the stator tooth is positioned axially above the base plate, without being recessed into a hole, while the stiffener tab 604 is positioned circumferentially adjacent to the stator tooth. In a further alternative design, the stiffener tab is positioned axially below a stator tooth, wherein the stator tooth is not partially recessed into a hole in a base plate, although in this design the stiffener tab occupies axial space.

Figure 9B:
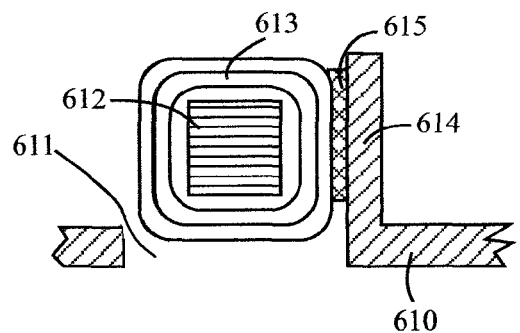
FIG. 9B is a sectional side view of stator windings partially recessed into a hole in a base plate for a spindle motor, in an example embodiment of FIG. 9A, wherein a stiffener tab extends from the base plate and attaches to the stator tooth, in accordance with an embodiment of the present invention.

FIG. 9B illustrates an example embodiment of FIG. 9A, wherein a portion of a stator tooth that is recessed into hole 611 in the base plate 610 is a portion of the stator windings 613, without the lamination stack 612 similarly being recessed into the hole 611. Also, an adhesive 615 is shown bonding stiffener tab 614 to the stator winding 613. This design is useful for a stamped base plate 610.

Figure 10:
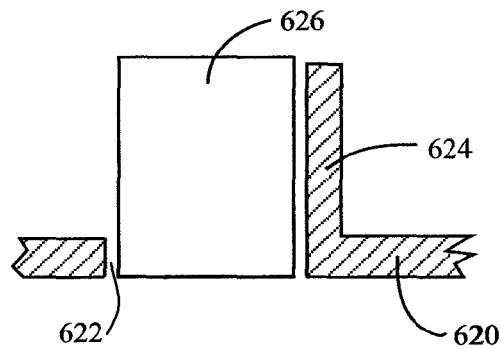
FIG. 10 is a sectional side view of a stator tooth partially recessed into a hole in a base plate for a spindle motor, wherein a stiffener tab extends from the base plate, in accordance with an embodiment of the present invention.

As illustrated in FIG. 10, a sectional side view is shown of a stator tooth 626 partially recessed into a hole 622 in a base plate 620 for a spindle motor. A stiffener tab 624 extends from the base plate 620, in accordance with an embodiment of the present invention. The stiffener tab 624 is positioned circumferentially adjacent to the stator tooth 626, and the stiffener tab 624 remains separated from the stator tooth 626, rather than connected via an adhesive as in FIG. 9. Again, in an alternative design, the stator tooth is positioned axially above the base plate, without being recessed into a hole.

Figure 11:
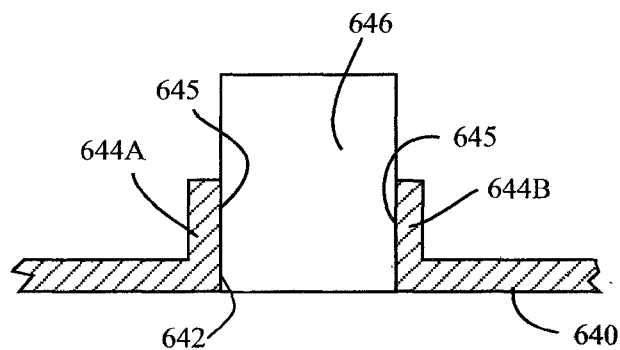
FIG. 11 is a sectional side view of a stator tooth partially recessed into a hole in a base plate for a spindle motor, wherein two stiffener tabs extend from the base plate and attach to the stator tooth, in accordance with an embodiment of the present invention.

FIG. 11 is a sectional side view of a stator tooth 646 partially recessed into a hole 642 in a base plate 640 for a spindle motor. Two stiffener tabs 644A and 644B extend from the base plate 640 and attach to at least a portion of the stator tooth 646. As an example, the stiffener tabs 644A and 644B may be attached to the stator windings only, to the stator lamination stack only, or to both the stator windings and stator lamination stack. If the stiffener tabs 644A and 644B are electrically conductive, then they may be electrically insulated from stator tooth 646 to avoid any electrical shorting of the stator tooth 646. The stiffener tabs 644A and 644B are positioned circumferentially adjacent to the stator tooth 646, and, optionally, an adhesive 645 interlocks the stator tooth 646 and the stiffener tabs 644A and 644B, thereby dampening any vibration of the stator tooth 646. The adhesive directly connects the stiffener tabs 644A and 644B to the stator lamination stack, to the stator windings, or to both the stator lamination stack and the stator windings. The stiffener tabs 644A and 644B are formed either from a portion of the base plate 640 that is displaced to form the hole 642 (as shown in FIG. 5), or formed from a separate material that is attached to the base plate 640 using, for example, an adhesive. Also, it is to be appreciated that by forming a stiffener tab on each circumferential side of a stator tooth, the result is that two stiffener tabs are formed between adjacent stator teeth.

Figure 12:
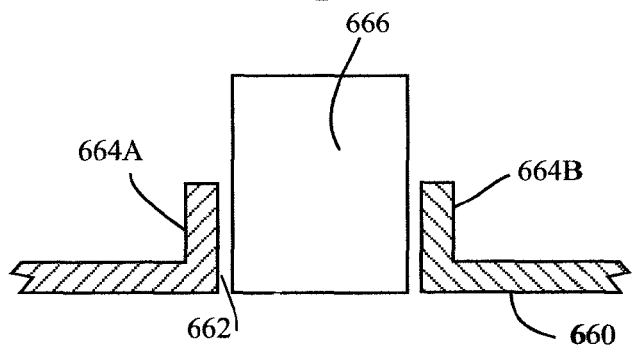
FIG. 12 is a sectional side view of a stator tooth partially recessed into a hole in a base plate for a spindle motor, wherein two stiffener tabs extend from the base plate, in accordance with an embodiment of the present invention.

As illustrated in FIG. 12, a sectional side view is illustrated of a stator tooth 666 partially recessed into a hole 662 in a base plate 660 for a spindle motor. Two stiffener tabs 664A and 664B extend from the base plate 660. The stiffener tabs 664A and 664B are positioned circumferentially adjacent to the stator tooth 666. The stiffener tabs 664A and 664B are formed either from a portion of the base plate 660 that is displaced to form the hole 662 (as shown in FIG. 5), or formed from a separate material that is attached to the base plate 660 using, for example, an adhesive. Again, it is to be appreciated that by forming a stiffener tab on each circumferential side of a stator tooth, the result is that two stiffener tabs are formed between adjacent stator teeth.

Figure 13:
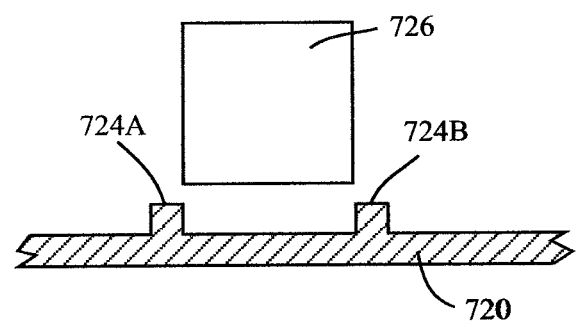
FIG. 13 is a sectional side view of a stator tooth, a base plate and stiffener tabs, for a spindle motor, wherein the stiffener tabs extend from the base plate and are positioned axially below the stator tooth while being circumferentially adjacent to the stator tooth, in accordance with an embodiment of the present invention.

As illustrated in FIG. 13, a sectional side view is shown of a stator tooth 726, a base plate 720 and stiffener tabs 724A and 724B, for a spindle motor. The two stiffener tabs 724A and 724B extend from the base plate 720 and are positioned axially below the stator tooth 726 while being circumferentially adjacent to the stator tooth 726. Here, stiffener tabs 724A and 724B may be formed by a method including attaching to base plate 720 and casting along with base plate 720, as described above.

While the embodiments described illustrate a stiffener tab extending from a base plate in a direction generally toward a stator, in an alternative embodiment, the stiffener tab extends from a base plate with a distal end oriented in a direction 180 degrees away from the stator.

Modifications and variations may be made to the disclosed embodiments while remaining within the spirit and scope of the invention. The implementations described above and other implementations are within the scope of the following claims.

I claim:

1. A base plate comprising:
   a surface comprising a first through hole and a second through hole,
      wherein said first through hole is configured to accept a tooth of a stator; and
   a plurality of tabs extending from said surface,
      wherein a first tab of said plurality of tabs is positioned at a first periphery of said first through hole,
      wherein said first tab is formed from a first portion of said base plate that is displaced to form said first through hole,
      wherein a second tab of said plurality of tabs is positioned at a second periphery of said second through hole,
      wherein said second tab is formed from a second portion of said base plate that is displaced to form said second through hole, and
      wherein said first and second tabs each extend at about a ninety degree angle from said surface.

2. The base plate of claim 1, wherein said first tab is positioned circumferentially adjacent to said first through hole, and wherein said second tab is positioned circumferentially adjacent to said second through hole.

3. The base plate of claim 1, wherein said plurality of tabs further comprises a third tab and a fourth tab, wherein said third tab is positioned at said first periphery of said first through hole, and wherein said fourth tab is positioned at said second periphery of said second through hole.

4. The base plate of claim 3, wherein said third tab is formed from a third portion of said base plate that is displaced to form said first through hole, and wherein said fourth tab is formed from a fourth portion of said base plate that is displaced to form said second through hole.

5. The base plate of claim 1, wherein said first and second tabs are operable to increase a stiffness of said base plate.

6. The base plate of claim 1, wherein said first and second tabs are operable to change a resonant frequency of said base plate.

7. A spindle motor comprising:
   a base plate comprising:
      a surface comprising a first through hole and a second through hole; and
      a plurality of tabs extending from said surface,
         wherein a first tab of said plurality of tabs extends from said first through hole and is positioned at a first periphery of said first through hole,
         wherein a second tab of said plurality of tabs extends from a second through hole and is positioned at a second periphery of said second through hole, and
         wherein said first and second tabs each extend at about a ninety degree angle from said surface; and
   a stator comprising a plurality of teeth, wherein a first tooth of said plurality of teeth is disposed adjacent to said first tab, and wherein a second tooth of said plurality of teeth is disposed adjacent to said second tab.

8. The spindle motor of claim 7, wherein said first tab is positioned circumferentially adjacent to said first through hole, and wherein said second tab is positioned circumferentially adjacent to said second through hole.

9. The spindle motor of claim 7, wherein said first tab is formed from a first portion of said base plate that is displaced to form said first through hole, and wherein said second tab is formed from a second portion of said base plate that is displaced to form said second through hole.

10. The spindle motor of claim 7, wherein said plurality of tabs further comprises a third tab and a fourth tab, wherein said third tab is positioned at said first periphery of said first through hole, and wherein said fourth tab is positioned at said second periphery of said second through hole.

11. The spindle motor of claim 10, wherein said third tab is formed from a third portion of said base plate that is displaced to form said first through hole, and wherein said fourth tab is formed from a fourth portion of said base plate that is displaced to form said second through hole.

12. The spindle motor of claim 7, wherein said first and second tabs are operable to increase a stiffness of said base plate.

13. The spindle motor of claim 7, wherein said first and second tabs are operable to change a resonant frequency of said base plate.

14. The spindle motor of claim 7, wherein a first portion of said stator is disposed in said first through hole, and wherein a second portion of said stator is disposed in said second through hole.

15. The spindle motor of claim 7, wherein a first portion of said stator is coupled with said first tab, and wherein a second portion of said stator is coupled with said second tab.

16. A method comprising:
   forming a plurality of through holes in a surface of a base plate for a spindle motor,
      wherein said plurality of through holes comprises a first through hole and a second through hole, and
      wherein said forming further comprises forming said first through hole to accept a first tooth of a stator; and
   forming a plurality of tabs extending from said plurality of through holes in said surface,
      wherein a first tab of said plurality of tabs is positioned at a first periphery of said first through hole,
      wherein a second tab of said plurality of tabs is positioned at a second periphery of said second through hole, and
      wherein said first and second tabs each extend at about a ninety degree angle from said surface.

17. The method of claim 16, wherein said first tab is positioned circumferentially adjacent to said first through hole, and wherein said second tab is positioned circumferentially adjacent to said second through hole.

18. The method of claim 16, wherein said forming said plurality of tabs further comprises displacing a first portion of said base plate to form said first tab, and wherein said forming said plurality of tabs further comprises displacing a second portion of said base plate to form said second tab.

19. The method of claim 16, wherein said plurality of tabs further comprises a third tab and a fourth tab, wherein said third tab is positioned at said first periphery of said first through hole, and wherein said fourth tab is positioned at said second periphery of said second through hole.

20. The method of claim 19, wherein said forming said plurality of tabs further comprises displacing a third portion of said base plate to form said third tab, and wherein said forming said plurality of tabs further comprises displacing a fourth portion of said base plate to form said fourth tab.

21. The method of claim 16, wherein said forming said plurality of tabs further comprises configuring said first and second tabs to increase a stiffness of said base plate.

22. The method of claim 16, wherein said forming said plurality of tabs further comprises configuring said first and second tabs to change a resonant frequency of said base plate.

23. The method of claim 16, wherein said forming said plurality of tabs further comprises forming said plurality of tabs using a process selected from a group consisting of a stamping process and a casting process.

24. The base plate of claim 1, wherein said first and second tabs each extend radially along said surface.

25. The spindle motor of claim 7, wherein said first and second tabs each extend radially along said surface.

26. The method of claim 16, wherein said first and second tabs each extend radially along said surface.

* * * * *